UNITED STATES PATENT OFFICE 2,308,664

COATING COMPOSITION

Arthur E. Young and Richard D. Freeman, Midland, Mich., assignors to The Dow Chemical Company, Midland, Mich., a corporation of Michigan No Drawing. Application September 21, 1940, Serial No. 357,754

3 Claims. (Cl. 106—170)

This invention relates to new coating compositions and more particularly concerns wax emulsions adapted to be applied primarily as sizing and waterproofing coatings to textiles, paper, wood, or other porous surfaces.

Various solutions, dispersions, or emulsions of fats, oils, waxes, paraffin, and other water-insoluble substances have previously been proposed for water-proofing purposes, and several methods of applying such coatings are known in the art. According to one process now commercially employed, the material to be treated is first immersed in a solution of a water-soluble compound, followed by another immersion in a solution of a salt which will react with the first compound and render it insoluble. This method of waterproofing, however, does not use wax, and has the disadvantages of requiring two steps and of depositing on the material an excess of one of the reagents, which must subsequently be removed. Equally disadvantageously, the initially small wax particles in coatings deposited from unmodified emulsions of waxes tend to agglomerate into large particles under many conditions, making them especially unsuitable for waterproofing paper. Coatings containing aluminum salts, such as aluminum formate, aluminum acetate, or alum, either alone or in combination with waxes, often fail to impregnate satisfactorily the material it is desired to coat, and, in common with many of the aforementioned compositions, they give coatings which are either insufficiently wash-resistant, or are too stiff, or too harsh for the intended purpose.

An object of the present invention is to provide a waterproofing composition which, when applied as a coating, will impregnate uniformly a variety of materials, such as textiles, paper, furs, feathers, wood, plaster, and the like and render them substantially waterproof. Another object of the invention is to provide a simple one step process for applying a waterproof coating to materials of the nature described above. Still another object of the invention is to provide a coating composition for fabrics and the like which will impart the desired waterproofing characteristics and yet not make the fabric unduly stiff or unpleasant or harsh to the touch. Still further objects and advantages will become apparent as the description of the invention proceeds.

We have now found that the above objects can be accomplished by forming an aqueous emulsion containing a wax and aluminum cellulose glycollate in the ratio of from 1 to 15 parts by weight of the wax to 1 part of aluminum cellulose glycollate, and an emulsifying agent, and applying this emulsion in a single treatment to the article it is desired to coat.

A preferred method of making the new emulsion comprises adding, with stirring, a quantity of a molten wax containing oleic acid to a dilute solution of ammonia, and then mixing this emulsion immediately and thoroughly with a solution of aluminum cellulose glycollate in dilute aqueous ammonia. The preferred ratio of ingredients is that above specified. The emulsion thus formed, wherein ammonium oleate is the emulsifier, may then be applied as a continuous waterproof coating on fabrics or the like by passing the material to be coated continuously through a bath of the emulsion, after which the coated material may be passed over a heated roll to evaporate the ammonia from the surface, washed to remove any soluble compounds, and then dried, leaving a water-insoluble coating of the wax and aluminum cellulose glycollate. Textiles or fabrics coated in this manner are thoroughly waterproofed and yet are not unduly stiff or unpleasant to the touch. In addition, the coating composition thus applied is found to remain in the fabric even after several washings. Alternatively the emulsion may be applied to paper, wood, etc., by spraying, dipping, brushing, or like operations, after which the treated mtaerial may be subjected to slight heating in order to dry the coating. Paper, coated with the improved composition by one of the methods described above, has smooth, glossy, and waterproof surfaces. Hosiery and other silks treated with the new waterproofing compositions are substantially spot-proof.

The new emulsions are stable and may be kept indefinitely and yet retain their characteristically small particle size. When they are applied to fabrics, such emulsions not only serve to waterproof and to size them, but also render them mucth sronger and wear resistant, without at the same time stiffening them.

The degree of wash resistance obtained depends on the ratio of wax to aluminum cellulose glycollate employed. That is, the higher the relative proportion of aluminum cellulose glycollate, as compared to the wax present, the better the waterproofness and wash resistance. Lower proportions of aluminum cellulose glycollate may be used when treating paper or fur, where a high wash resistance is not so necessary. Aluminum cellulose glycollate has the peculiar property of being insoluble in almost all sol- -vents with the exception of dilute ammonia, and it is this unusual characteristic that makes it suitable for use in a waterproofining composition. The aluminum cellulose glycollate may be dissolved in the ammonia, and this solution used to form a wax emulsion that will penetrate the material it is desired to treat, after which the ammonia may be evaporated off, leaving a waterproof coating of the aluminum cellulose glycollate and wax.

Waxes suitable for use in the invention are paraffin wax, montan wax, beeswax, carnauba wax, esparto grass wax, and the like, paraffin wax being preferred because of its cheapness and efficiency.

When making a solution of aluminum cellulose glycollate for use in the emulsions, as dilute a solution of ammonia as possible should be employed to avoid giving objectionably strong odors to the finished emulsions. Ammonia solutions as dilute as 0.25 per cent may be used. While a proportion as high as 15 parts of wax to one of aluminum cellulose glycollate may be employed, we prefer to use a smaller proportion of wax, say between 5 and 10 parts for each part of the glycollate. The adhesive characteristics of the emulsion are greatest when these lower amounts of wax are incorporated in the emulsion.

The following examples illustrate ways in which the principle of the invention may be applied, but are not to be construed as limiting the scope thereof.

*Example 1*

A solution was prepared containing 1.6 grams of aluminum cellulose glycollate dissolved in 200 cc. of a 0.25 per cent ammonium hydroxide solution. This solution was then added slowly with constant agitation to a wax suspension prepared by bringing 50 cc. of water and 1 cc. of oleic acid to a temperature of 90° C. and then adding thereto 8 grams of molten paraffin. In order to reduce the solids content of the resulting emulsion 700 cc. of 0.25 per cent ammonia was then added slowly, with stirring. The emulsion remained stable when thus diluted. Silk hose were then dipped into the diluted emulsion, passed through wringer rolls, and dried for 5 minutes at 70°–80° C. The dry hose were well sized and had good splash proof properties. The hose were then washed in a dilute solution of sodium lauryl sulphate (a commercial household detergent sold under the name of "Dreft") at 60°–70° C. After air drying overnight the hose were still sized as well as they had been prior to washing. The sizing on these hose withstood eleven such washings. After twelve washings there were indications that some, though not all, of the sizing had been lost. It should be noted that the sized hose had as soft a handle as the untreated hose, and yet did not appear to be as limp, i. e., when folded on itself and placed flat on a 45° inclined surface, it remained in place, whereas the untreated hose, placed on the same surface, slithered into a shapeless heap.

*Example 2*

0.533 gram of aluminum cellulose glycollate was dissolved in 200 cc. of 0.25 per cent ammonium hydroxide, and this solution was added to a wax suspension prepared as described in Example 1. There was then added to the resulting emulsion 593.5 cc. of ammonium hydroxide, with stirring. Silk hose were dipped into this emulsion, and, after drying, were well sized and possessed good splash proof characteristics. However, after a series of washings as described in Example 1, the sizing was lost in part.

The optimum paraffin to aluminum cellulose glycollate ratio is less than 15 to 1, as evidenced by the improved results obtained in Example 1, where only 5 parts of wax to 1 of aluminum cellulose glycollate were employed, contrasted with Example 2 where the ratio was 15 of wax to 1 of the glycollate.

In the examples, oleic acid was used, in the form of ammonium oleate, as the emulsifying agent. This agent may be added in other manners than those shown. Thus, a paraffin melt containing oleic acid or other fatty acid may be stirred into hot ammonia water, and the resulting emulsion mixed with a solution of aluminum cellulose glycollate. Further, a wax melt containing a higher fatty acid may be stirred directly into a heated slightly ammoniacal solution of aluminum cellulose glycollate. Instead of ammonium oleate, many other emulsifying agents may be used, including Aerosol OT, Santomerse, Duponal ME, and Alkanol S, which, in the main, are salts of sulphated alcohols or of sulphonated hydrocarbons or phenols, as shown in Industrial and Engineering Chemistry for January of 1939.

We claim:

1. As a surface treating composition, an emulsion of from 1 to 15 parts by weight of a wax in an aqueous ammoniacal solution of 1 part by weight of aluminum cellulose glycollate.

2. As a surface treating composition, an emulsion of from 1 to 5 parts by weight of a wax in an aqueous ammoniacal solution of 1 part by weight of aluminum cellulose glycollate.

3. As a surface treating composition, an emulsion of from 1 to 15 parts by weight of paraffin in an aqueous ammoniacal solution of 1 part by weight of aluminum cellulose glycollate.

ARTHUR E. YOUNG.
RICHARD D. FREEMAN.